US011050705B2

(12) United States Patent
Kodaypak et al.

(10) Patent No.: US 11,050,705 B2
(45) Date of Patent: Jun. 29, 2021

(54) SIGNALING OPTIMIZATION DURING SHORT MESSAGING FOR INTERNET OF THINGS DEVICES IN A MOBILITY NETWORK

(71) Applicant: AT&T INTELLECTUAL PROPERTY I, L.P., Atlanta, GA (US)

(72) Inventors: Rajendra Prasad Kodaypak, Sammamish, WA (US); Gaurav Gupta, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 330 days.

(21) Appl. No.: 15/464,301

(22) Filed: Mar. 20, 2017

(65) Prior Publication Data

US 2018/0270188 A1    Sep. 20, 2018

(51) Int. Cl.
*H04L 12/58* (2006.01)
*H04W 4/14* (2009.01)
*H04L 29/06* (2006.01)

(52) U.S. Cl.
CPC .......... *H04L 51/38* (2013.01); *H04L 63/0428* (2013.01); *H04W 4/14* (2013.01)

(58) Field of Classification Search
CPC . H04L 51/38; H04L 43/0852; H04L 63/0428; H04W 4/14

(Continued)

(56) References Cited

U.S. PATENT DOCUMENTS 8,326,985 B2 * 12/2012 Luna ................. H04L 69/28
709/224
9,204,415 B2   12/2015 Ng et al.
(Continued)

FOREIGN PATENT DOCUMENTS

WO    2015170009 A1    11/2015
WO    2016182349 A1    11/2016
WO    2018007642 A1    1/2018

OTHER PUBLICATIONS

Kuo et al. "Power Saving Scheduling Scheme for Internet of Things over LTE/LTE-Advanced Networks", file:///C:/Users/pngankam/Downloads/Power_Saving_Scheduling_Scheme_for_Internet_of_Thi%20(1).pdf (Year: 2015).*

(Continued)

*Primary Examiner* — James E Springer
*Assistant Examiner* — Patrick F Ngankam
(74) *Attorney, Agent, or Firm* — Amin, Turocy & Watson, LLP

(57) ABSTRACT

One or more protocols between a control plane entity (e.g., a mobility management entity (MME)) and its peer nodes (e.g., mobile switching center (MSC) and/or short message service center (SMSC)) are enhanced to improve short messaging services for Internet of things (IoT) devices. Oftentimes, IoT devices enter an extended sleep mode during which they cannot be reached by the control plane entity. In one aspect, the control plane entity can determine a wait period based on information, such as, but not limited to, device context data, mapping tables, policy data, commercial traffic data, latency data, device delay tolerance, sleep mode timer values, etc. The wait period can be provided to the peer nodes, which can utilize the wait period to control one or more message retry mechanisms based on IoT device behaviors resulting in an improvement of overall IoT service behaviors and a delivery of superior IoT customer experience.

20 Claims, 12 Drawing Sheets

(58) Field of Classification Search
USPC .......................................................... 709/206
See application file for complete search history.

(56) References Cited

U.S. PATENT DOCUMENTS

| | | | |
|---|---|---|---|
| 9,344,967 B2 | 5/2016 | Lee et al. | |
| 9,369,961 B2 | 6/2016 | Berggren et al. | |
| 9,497,566 B2 | 11/2016 | Aghih et al. | |
| 9,930,591 B2 | 3/2018 | Won et al. | |
| 2010/0279676 A1 | 11/2010 | Benn et al. | |
| 2011/0047225 A1* | 2/2011 | Smith | H04L 49/90 |
| | | | 709/206 |
| 2012/0108225 A1* | 5/2012 | Luna | H04W 28/0215 |
| | | | 455/418 |
| 2013/0301501 A1 | 11/2013 | Olvera-Hernandez et al. | |
| 2014/0056193 A1 | 2/2014 | Huang et al. | |
| 2014/0206333 A1 | 7/2014 | Qiang | |
| 2014/0269658 A1 | 9/2014 | Sadasivam et al. | |
| 2015/0163831 A1 | 6/2015 | Wang et al. | |
| 2015/0215868 A1 | 7/2015 | Xu | |
| 2015/0271229 A1* | 9/2015 | Bullotta | H04L 65/60 |
| | | | 709/219 |
| 2015/0296482 A1 | 10/2015 | Baskar et al. | |
| 2015/0341884 A1 | 11/2015 | Das et al. | |
| 2016/0127995 A1 | 5/2016 | Merlin et al. | |
| 2016/0142974 A1 | 5/2016 | Lindoff et al. | |
| 2016/0205622 A1 | 7/2016 | Ronneke et al. | |
| 2016/0242231 A1 | 8/2016 | Vajapeyam et al. | |
| 2016/0255578 A1 | 9/2016 | Lin et al. | |
| 2016/0286466 A1 | 9/2016 | Huang et al. | |
| 2016/0286491 A1 | 9/2016 | Haneji et al. | |
| 2016/0295504 A1 | 10/2016 | Wang et al. | |
| 2016/0316432 A1 | 10/2016 | Hsu et al. | |
| 2016/0345293 A1 | 11/2016 | Diachina et al. | |
| 2017/0272993 A1 | 9/2017 | Jeong et al. | |
| 2017/0311303 A1 | 10/2017 | Ahn et al. | |
| 2018/0054376 A1 | 2/2018 | Hershey et al. | |
| 2018/0054796 A1 | 2/2018 | Edge | |
| 2018/0063860 A1* | 3/2018 | Yeung | H04W 4/70 |
| 2018/0110085 A1 | 4/2018 | Tseng | |
| 2018/0146260 A1 | 5/2018 | Li et al. | |
| 2018/0176860 A1* | 6/2018 | Triano | H04W 52/0203 |
| 2018/0324671 A1 | 11/2018 | Palnati et al. | |

OTHER PUBLICATIONS

Kuo et al. "Kuo Power Saving Scheduling Scheme for Internet of Things Over lte/lte Advanced Networks", https://www.hindawi.com/journals/misy/2015/971538/ (Year: 2015).*

Van et al. "Power-Saving Methods for Internet of Things over Converged Fiber-Wireless Access Networks." IEEE Communications Magazine 54.11 (2016): 166-175. [https://www.researchgate.net/publication/306928954_Power-Saving_Methods_for_Internet_of_Things_over_Converged_Fiber-Wireless_Access_Networks]. Retrieved on Jan. 10, 2017, 10 pages.

Abbas et al., "A survey on energy conserving mechanisms for the internet of things: Wireless networking aspects." Sensors 15.10 (2015): 24818-24847. [https://www.ncbi.nlm.nih.gov/pmc/articles/PMC4634437/#sec4-sensors-15-24818]. Retrieved on Jan. 10, 2017, 19 pages.

Kuo et al., "Power Saving Scheduling Scheme for Internet of Things over LTE/LTE-Advanced Networks." Mobile Information Systems 2015 (2015). [http://downloads.hindawi.com/journals/misy/2015/971538.pdf]. Retrieved on Jan. 10, 2017, 12 pages.

3GPP, "Universal Mobile Telecommunications System (UMTS); LTE; Mobility Management Entity (MME)," Visitor Location Register (VLR) SGs interface specification (3GPP TS 29.118 version 13.6.0 Release 13), © European Telecommunications Standards Institute 2017, 78 pages.

Non-Final Office Action received for U.S. Appl. No. 16/003,730 dated Mar. 6, 2019, 22 Pages.

* cited by examiner

SIGNALING OPTIMIZATION DURING SHORT MESSAGING FOR INTERNET OF THINGS DEVICES IN A MOBILITY NETWORK

TECHNICAL FIELD

The subject disclosure relates to wireless communications, e.g., signaling optimization during short messaging for Internet of things (IoT) devices in a mobility network.

BACKGROUND

Internet of things (IoT) technology holds a great promise for the future of the global communications industry. As the number of connected devices that are capable of establishing connectivity with other devices and/or passive objects to exchange data continues to rise steadily, the IoT technology gains widespread proliferation in the information technology industry. With an anticipated projection of over 20 billion devices in the next few years, service providers, network providers and/or cloud providers will observe a net increase in their traffic handling capabilities. This can help the providers enable new IoT services tailored to targeted industry verticals. While there are several ongoing competitive developments in the IoT domain, some key areas where there is an immediate focus include smart city, transportation and/or utility services, virtual and augmented reality, etc. Low power wide area networking technologies using third generation partnership project (3GPP) defined standards and their ongoing evolution towards fifth generation (5G) seem to provide a solid framework to support such massive IoT initiatives.

3GPP network functions defined in the standards are their infancy and are to be evaluated carefully to determine the net value they offer when rolling out new IoT services. Messaging is one such key service that has been widely successful for a plethora of mobile devices. As new categories of IoT devices emerge and are deployed to provide a variety of different services across the industry verticals, short messaging will continue to provide value to the service providers. In the traditional messaging architecture for long term evolution (LTE)/4G networks, a mobile switching center (MSC) serves as a critical network function that interfaces with a mobility management entity (MME) and a short message service center (SMSC). In case of LTE/4G networks, the MME and the MSC communicate via the SGs application protocol (SGsAP). The SGsAP as defined by 3GPP has various shortcomings with respect to the signaling procedures when servicing IoT devices, and oftentimes results in unwanted signaling between control plane entities such as a MME and a mobile switching center (MSC) as well as between the MSC and a SMSC, frequent retransmissions, and/or unpredictable behavior in the mobility network. Such behaviors can lead to potential service disruptions and/or an unpleasant experience for customers/enterprises.

DETAILED DESCRIPTION

Figure 1:
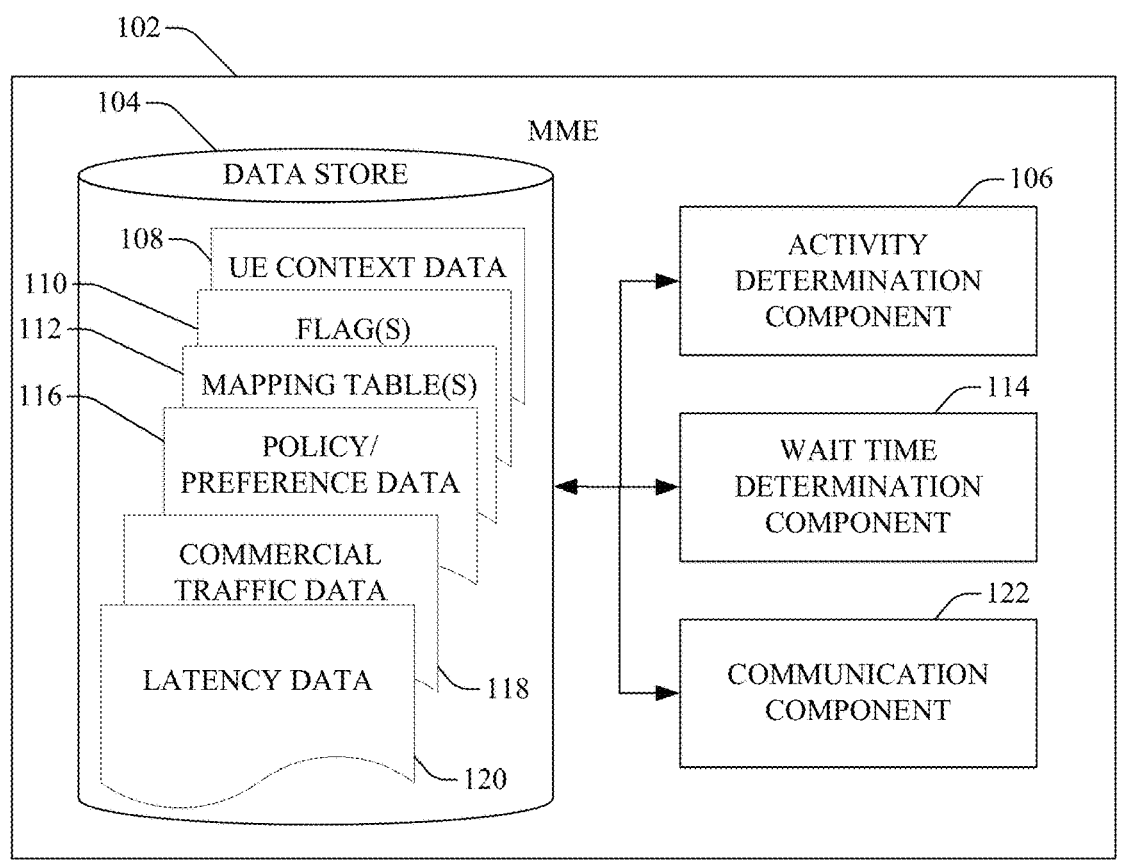
FIG. 1 illustrates an example system that facilitates enhanced message delivery for Internet of things (IoT) devices based on device status and reachability.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," "engine," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, it is noted that the term "upstream" as used herein refers to a direction in which data sent for a "stream" flowing from a network service provider device (or content provider device or application provider device) to a user device. As an example, if a first device is closer to (fewer hops away from) the network service provider device than a second device, then the first device is said to be upstream from the second device or conversely, the second device is downstream from the first device.

Furthermore, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

Aspects or features of the disclosed subject matter can be exploited in substantially any wired or wireless communication technology; e.g., universal mobile telecommunications system (UMTS), Wi-Fi, worldwide interoperability for microwave access (WiMAX), general packet radio service (GPRS), enhanced GPRS, third generation partnership project (3GPP) long term evolution (LTE), fifth generation (5G), third generation partnership project 2 (3GPP2) ultra mobile broadband (UMB), high speed packet access (HSPA), zig-bee, or another IEEE 802.XX technology, low power wide area (LPWA) and/or non-3GPP standard based solutions, such as, but not limited to, Ingenu, Sigfox, and/or LoRa, etc. Additionally, substantially all aspects of the disclosed subject matter can be exploited in legacy (e.g., wireline) telecommunication technologies.

Internet of things (IoT), which is the future of internet connectivity, enables creation of an information rich eco-system that can enrich modern connected way of life and transform the way in which businesses as well as consumers function today. Typically, IoT/machine-to-machine (M2M) devices can have different characteristics than regular/commercial UEs (e.g., non-IoT devices, such as, but not limited to, smart phones, tablet computers, personal computers, etc.). For example, the IoT/M2M devices collectively generate a much greater number of signaling connections in the mobile core network as compared to regular UEs. Further, in another example, the service/application provider often performs simultaneous device triggering and monitoring for targeted IoT applications and services. The systems and methods disclosed herein can provide various enhancements to conventional entities to effectively deal with delivery of messages (e.g., text messages) to the IoT/M2M devices communication and their eco-system.

As a variety of IoT device categories emerge based on 3GPP standards evolution supporting a multitude of services, there is an increasing demand on the various network functions within the mobility infrastructure to be more intelligent, dynamic, adaptive, and flexible with their inter-working to provide the best possible node level functions and end-to-end service behaviors. Conventional application protocols (APs) and/or interfaces between the control plane devices (e.g., mobility management entity (MME), mobile switching center (MSC), etc.) and/or a messaging server (e.g., short message service center (SMSC)) do not address the end-to-end application and/or messaging service behaviors required by a variety of new and emerging IoT devices. The lack of adequate message exchange between these devices and/or application providers can result in unwanted signaling, retransmissions, and/or unpredictable behavior in the mobility network. The systems and methods disclosed herein facilitate control of these behaviors in a proactive manner to minimize potential service disruptions and/or unpleasant experience for customers/enterprises.

In one aspect, the disclosed systems and methods, in one or more non-limiting embodiments, provide enhancements to an AP between the MME and MSC nodes that can significantly improve short messaging services for the IoT devices. According to an embodiment, based at least on IoT device types and their behaviors, the MME can determine a wait period for message retransmissions when an IoT device is unreachable (e.g., operating in a low power/extended sleep mode). The MME can provide the wait period to the MSC, which in turn can forward the wait period directly to an SMSC. Based on the wait period, the SMSC can effectively control a message retry mechanism to improve overall IoT service behaviors and/or deliver superior IoT customer experience. Although, the systems and methods disclosed herein are described with respect to short message service (SMS) messaging, it is noted that the subject disclosure is not limited to SMS messaging and can be utilized for most any messages transmitted to/from IoT devices, such as, but not limited to an alphanumeric message, an encrypted message (e.g., binary encrypted message), an encoded message (e.g., unicode transmission format 8 (UTF8) message), etc.

Referring initially to FIG. 1, there illustrated is an example system 100 that facilitates enhanced message delivery for IoT devices based on device status and/or reachability, according to one or more aspects of the disclosed subject matter. In conventional network deployments, short message services are delivered via a non-access stratum (NAS) protocol between a user equipment (UE) and an MME that serves the UE. The MME interworks with an MSC by employing a SGs application protocol (AP) protocol and the MSC interworks with a SMSC via a signaling transfer point. The SMSC communicates with one or more IoT application providers that can reside outside the operator's network. Such communication can be performed either directly or indirectly, for example, via the use of a messaging services gateway. The conventional 3GPP standards defined SGsAP (TS 29.118, Rel.13) lacks adequate signaling message exchange capabilities between MME and MSC (and/or SMSC) that affect IoT UE behaviors in the mobility network, for example, during extended sleep modes.

Many IoT UEs operate for very long time periods, for example, months and years, without human intervention. Thus, to facilitate power conservation and extension of battery life, the IoT UEs can operate in extended/deep sleep modes, such as, but not limited to, power savings mode (PSM) and/or extended discontinuous reception (eDRX) mode. A PSM-capable IoT UE can request an active timer value (e.g., active timer-T3324) from a network device, for example, during an attach or a tracking area update (TAU) procedure. As an example, the active timer value can specify a time period during which the UE remains active and reachable by the network (e.g., by checking for paging according to a regular discontinuous reception (DRX) cycle) for mobile terminated transaction upon transition from connected to idle mode. The IoT UE can initiate the active timer when transitioning from a connected mode to an idle mode and on expiration of the active timer, the IoT UE can enter a PSM for a duration specified by a PSM timer (e.g., PSM timer-T3412 Extended; maximum value ranging from 12.8 days to 413.33 days). During the PSM, the IoT UE does not check for paging signals as there is no non-access stratum (NAS) signaling connection, but is still registered with the network. The IoT UE can exit the PSM when a UE originated transaction (e.g. periodic TAU, uplink data transmission) triggers the IoT UE to initiate a procedure towards the network. The eDRX mode is similar to the PSM but allows the IoT UE to remain inactive (e.g., unreachable) for longer periods of time within the active time period.

Conventional MMEs send, to the MSC, a suitable SGsAP cause in response to a paging request (e.g., SGsAP-PAGING-REQUEST) message received from the MSC, indicating that the UE is not reachable. However, since the MSC does not know how long the UE remains unreachable, the MSC can continue to retransmit paging requests for the UE to the MME based on a SMSC retry profile (e.g., if there is a pending mobile terminated message for the UE from a IoT service provider). This unnecessary signaling associated with retransmissions between the MSC and the SMSC and/or the MSC and the MME can negatively affect core network resources and can reduce the message delivery expectancy to the device. With a large volume of IoT devices served by the MME and the mobility network, such unnecessary signaling can be easily exacerbated, resulting in undesirable network and/or service behaviors.

System 100 comprises a MME 102 that employs information stored within data store 104 to reduce or avoid the unnecessary signaling. In one example, an activity determination component 106 can determine reachability status of a UE (e.g., IoT device) served by the MME 102. For example, the activity determination component 106 can determine that the UE has requested to enter an operating mode, during which the UE is not reachable and cannot receive messages from the MME 102 (e.g., a power saving mode (PSM) and/or extended discontinuous reception (eDRX)). In one aspect, the activity determination component 106 can leverage UE context data 108 (e.g., status, type, category, classification, application of an IoT device, etc.) stored within the data store 104 to tag a flag 110 for the UE and create a new (and/or update an existing) context mapping table 112 for the UE. As an example, the UE can comprises, but is not limited to, most any IoT/machine-to-machine (M2M) device (e.g., sensors, smart meters, smart home devices, smart city devices, tracking devices, security systems, smart energy grid devices, agricultural devices, etc.). Additionally or optionally, the UE can comprise most any electronic communication device such as, but not limited to, most any consumer electronic device, for example, a tablet computer, a digital media player, a digital camera, a cellular phone, a personal computer, a personal digital assistant (PDA), a smart phone, a laptop, a wearable device (e.g., smart watch, connected glasses, wrist monitor, etc.), a gaming system, etc. It is noted that the UE can be mobile, have limited mobility and/or be stationary.

In one embodiment, a wait time determination component 114 can determine timing data, for example, a wait time period, for which a peer node (e.g., MSC and/or SMSC) should avoid (or minimize) a transmission of communications/requests (e.g., text message requests) directed to the UE. Moreover, the wait time determination component 114 can determine the timing data based on values of network-defined timers (e.g., PSM timer, eDRX timer). As an example, the network-defined timers can utilize different values for different category of IoT devices. The wait time determination component 114 can determine the appropriate value based on the category of the served UE. Further, the wait time determination component 114 can utilize most any UE-defined and/or network operator-defined policies and/or preferences 116 to determine the timing data. Typically, different categories of IoT devices vary widely in terms of their service requirements, data throughput, latency, access priority and/or connectivity reliability and thus, different policies and preferences can be defined for different categories of the IoT devices. As an example, a first category of IoT devices can be delay tolerant, whereas a second category of IoT devices can be highly prone to latency errors. In this example scenario, the wait time determination component 114 can provide a timer expiration value as a retransmission time for the second category of IoT devices, while a time later than the timer expiration value can be provided for the first category of devices.

Additionally or alternatively, the wait time determination component 114 can utilize commercial data traffic data 118 (e.g., observed data, historical data, traffic patterns/trends, event data, etc.) to determine the timing data. For example, if the UE is expected to be available at 5 PM (e.g., the network-defined timer expires at 5 PM), which is determined to be the peak time for commercial traffic (e.g., traffic associated with category 3 and/or 4 (CAT-3/4) is predicted/likely to be above a defined threshold), the wait time determination component 114 can provide a later time, e.g., 7 PM, that does not conflict with the peak time for the commercial traffic (e.g., to avoid negatively affecting commercial traffic and/or services).

Further, in one aspect, the wait time determination component 114 can utilize latency data 120 associated with observed (and/or predicted latency) between the MME 102 and a peer node (e.g., SMSC) to determine the timing data. As an example, a diameter interface between the MME 102 and a SMSC can be routed through different geo-redundant diameter routing agents (DRAs), each path having different latency and/or congestion criteria. The wait time determination component 114 can utilize this latency information to determine an optimal wait time period (and/or specify a retransmission time). It is noted that MME 102 has access to various additional information, such as, but not limited to, the state of its peer nodes, congestion patterns, device behavior, etc. and accordingly, the wait time determination component 114 can employ the additional information to determine an optimized window of time to transfer the messaging data to the UE, for example, without negatively affecting the commercial services (e.g., associated with CAT3/4 devices).

In one embodiment, a communication component 122 can direct the determined timing data to peer nodes, such as, but not limited to, the MSC and/or the SMSC. Accordingly, an effective communication channel can be established between the MME and MSC (and/or SMSC) that addresses the various IoT device specific behaviors. By providing the timing data, communication between the MSC and SMSC nodes can be enhanced to effectively control the paging and/or message retry mechanisms in the network. Such enhancements between the various nodes triggered by an appropriate MME feedback can vastly benefit IoT service behaviors.

Typically, the MME 102 can manage the signaling related to mobility and security (authentication and authorization) for access to the network. MME 102 can also manage tracking and paging procedures of the LTE UEs in idle-mode. As an example, MME 102 can include at least a portion of functionality defined by 3GPP standards that are hereby incorporated by reference herein. Although data store 104 is depicted to reside within the MME 102, it is noted that the subject specification is not that limited and the data store 104 can reside (e.g., completely or partially) outside the MME 102 and can be remotely coupled to the MME 102. It is noted that the data store 104 can comprise volatile memory(s) or nonvolatile memory(s), or can comprise both volatile and nonvolatile memory(s). Examples of suitable types of volatile and non-volatile memory are described below with reference to FIG. 11. The memory (e.g., data stores, databases) of the subject systems and methods is intended to comprise, without being limited to, these and any other suitable types of memory.

Figure 2:
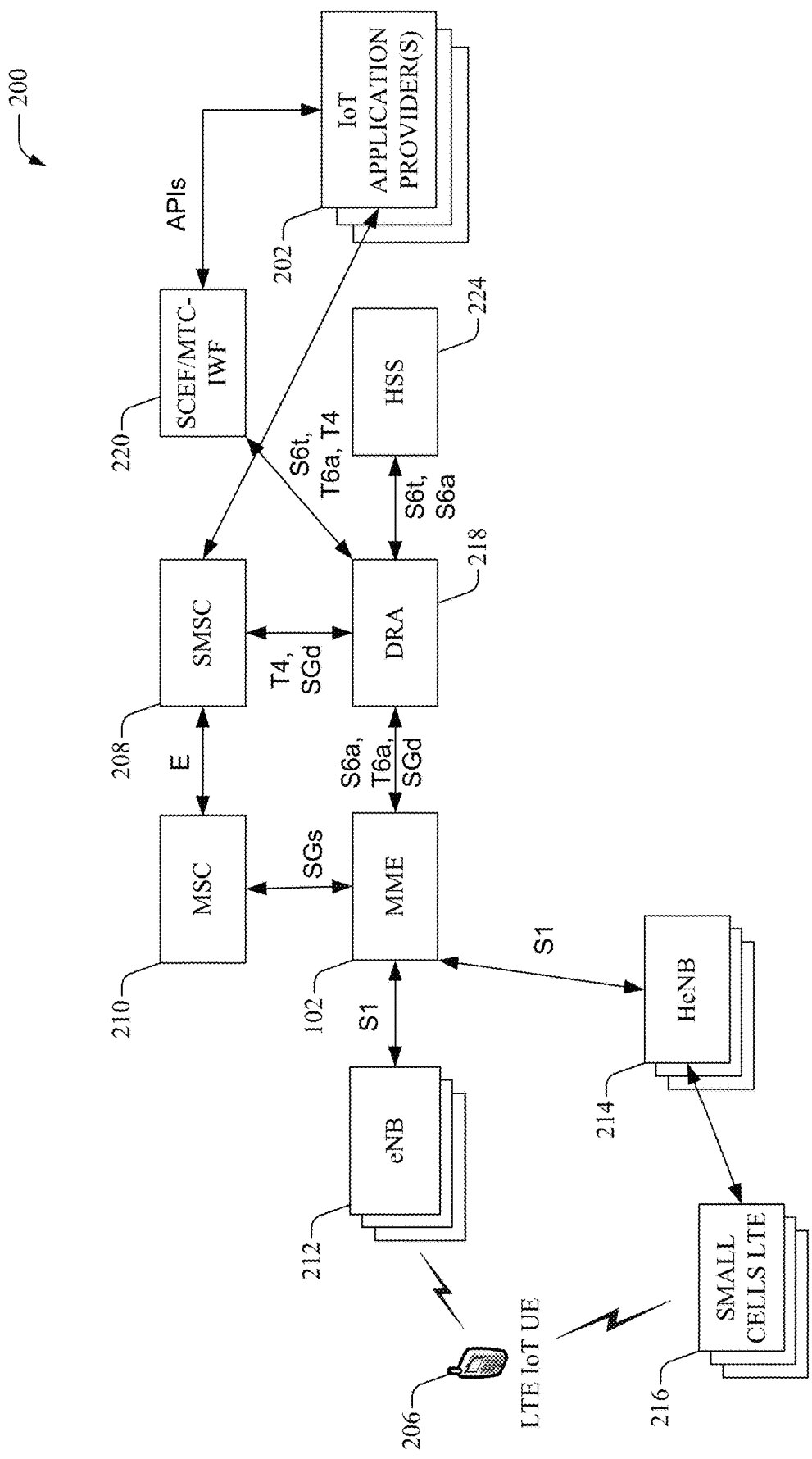
FIG. 2 illustrates an example system that optimizes message retransmissions in a long term evolution (LTE)/fourth generation (4G) messaging architecture for IoT services.

Referring now to FIG. 2, there illustrated is an example system 200 that optimizes message retransmissions in an LTE/4G messaging architecture for IoT services, in accordance with an aspect of the subject disclosure. It is noted that although system 200 is described with respect to a 3GPP LTE network, the subject disclosure is not limited to 3GPP LTE networks and can be utilized in most any communication network. Further, although not explicitly depicted in FIG. 2, system 200 can comprise additional nodes and/or devices for facilitating communications. Furthermore, it is noted that the MME 102 can comprise functionality as more fully described herein, for example, as described above with regard to system 100.

System 200 facilitates mobile terminated short message service (SMS) delivery from an external IoT application provider 202 to a UE, for example, a LTE IoT UE 206. As an example, the IoT application provider 202 can comprise most any application servers distributed over one or more industry segments; for example, IoT specific servers, industrial servers, e-health servers, fleet transportation servers, shipping or mailing servers, automotive servers, and the like. A service capability exposure function (SCEF)/machine type communication interworking function (MTC-IWF) 220 can be employed to expose the 3GPP/LTE network elements via secure policies (e.g. configured by the network provider) and APIs to the external IoT application provider 202.

In one aspect, the IoT application provider 202 can trigger a SMSC 208 to extract information from a network data store, for example, a Home Location Register (HLR) (not shown but in one embodiment, can be integrated within the HSS 224). The SMSC 208 can transmit a request (e.g., a mobile application part (MAP)_Send_Routing_Info_for_SMS) to the HLR and can extract the serving MSC (e.g., MSC 210) and an international mobile subscriber identity (IMSI) (e.g., based on a mobile station international subscriber directory number (MSISDN) to IMSI mapping) prior to sending the request to the MSC 210. The SMSC 208 can forward the messaging request to the MSC 210, which in turn can initiate paging (e.g., SGsAP-PAGING) towards MME 102 that is determined to serve the UE 206.

According to an aspect, MME 102 can determine the UE's state (e.g., idle mode, connected mode, deep sleep mode, etc.). If determined that the LTE IoT UE 206 is in the idle mode, the MME 102 can initiate a S1AP paging towards an eNodeB (eNB) 212 serving UE 206 (and/or Home eNB (HeNB) 214), which then can page the UE 206 in the list of cells (and/or small cells 216) that are defined as part of the paging policy. Once the UE 206 responds back with a service request to the MME 102, the MME 102 can send the service request to the MSC 210 to initiate SMS data delivery from the SMSC 208 to the UE 206.

When the UE 206 requests the network to enter into a low power mode (e.g., PSM and/or eDRX mode), for example, as part of a new attach and/or tracking area update (TAU) procedures, the MME 102 can grant the request or can override the device requested timers (e.g., active timer—T3324, PSM timer—T3412 Extended, etc.) based on internal provisioning and/or enablement of the power saving feature. This can enable the UE 206 to enter into the requested mode upon the expiry of the active timer. As an example, the UE requested timers can vary based on different industry verticals and/or the services they offer. Accordingly, the MME 102 can grant the requests as long as the timers fall within the range defined by the standards for a particular category of IoT devices. On entering the unreachable low power mode, the UE 206 can remain registered in the network although the UE 206 may not be accessible to receive communications from the network (including the MME 102).

Typically, the MSC 210 and/or SMSC 208 do not have complete visibility into the state of the UE 206 as is known by the MME. Moreover, the implicit and/or purge timers defined on the MSC 210 cannot differentiate between the device categories assigned to the UE 206 and can only apply a uniform policy for any device terminated message delivery. In some conventional systems, SMSCs can perform SMS retries ignoring feedback from MSC nodes. Additionally, since the timers on the MSC and SMSC nodes are not IoT device category aware, early detach and/or purging of such IoT devices in the MSC and SMSC, with varying PSM timer configurations and not aware of their mobility management state in the MME, could be detrimental to the end customers as well as the IoT service/application providers In contrast, MME 102 has access to information, such as, but not limited to, UE context information (e.g., operating mode, IoT device type/category, access priority, etc.), policy/preference data, latency data indicative of a delay for routing communication between the peer nodes (e.g., MSC 210, SMSC 208, DRA 218, etc.), commercial traffic (e.g., non-IoT traffic) patterns, etc. In one example, the MME 102 can receive at least a portion of the context information from a home subscriber store (HSS) 224. Thus, the MME 102 can determine, based on an analysis of the information, an optimal wait time period when the UE 206 is unreachable (e.g., in PSM/eDRX mode) and/or specify an optimal time for transmission/retransmission of data for the UE 206. In one example, the wait time can be representative of the PSM timer and/or eDRX timers for a specific category of IoT devices. Further, the exact time can be implementation dependent and based on a range that can be calculated by the MME (e.g., MME 102) serving all concurrent PSM devices. The wait time period and/or time for transmission/retransmission can be provided to the MSC 210, which can then forward the information to the SMSC 208 to avoid and/or reduce further retry mechanisms by the SMSC 208. This proactive relay mechanism by the MME 102 towards the MSC 210 and in turn to the SMSC 208 can ensure that the upstream nodes interwork appropriately by knowing the state of the devices and their categories to deliver optimal network and/or service functionality.

Figure 3:
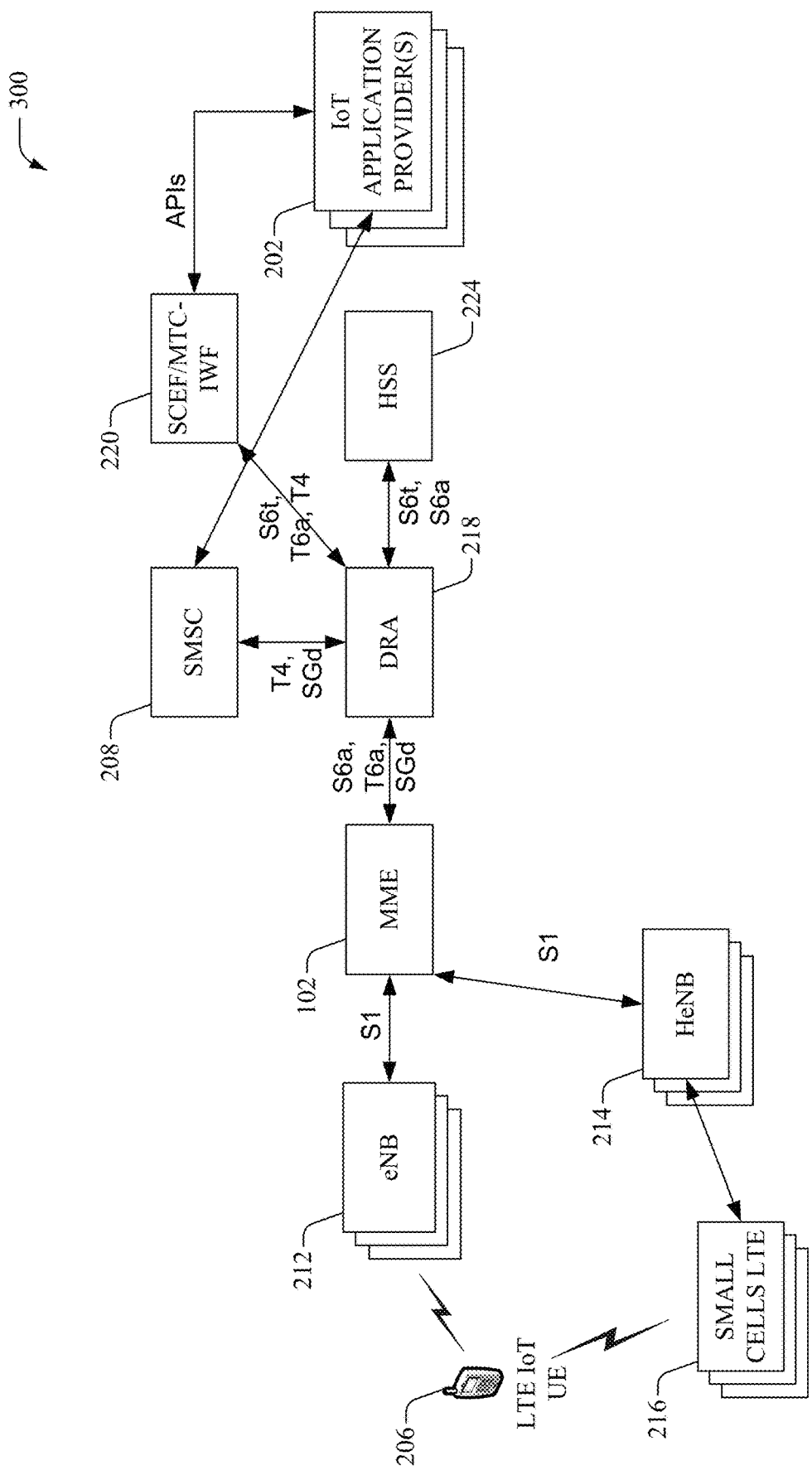
FIG. 3 illustrates an example system that optimizes message retransmissions in an evolved LTE messaging architecture for IoT services.

Referring now to FIG. 3, there illustrated is an example system 300 that optimizes message retransmissions in an evolved LTE messaging architecture for IoT services, in accordance with an aspect of the subject disclosure. It is noted that although system 300 is described with respect to an evolved LTE network, the subject disclosure is not limited to evolved LTE networks and can be utilized in most any communication network. Further, although not explicitly depicted in FIG. 3, system 300 can comprise additional nodes and/or devices for facilitating communications. Furthermore, it is noted that the MME 102, IoT application provider 202, LTE IoT UE 206, SMSC 208, eNB 212, HeNB 214, small cells LTE 216, DRA 218, SCEF/MTC-IWF 220, and HSS 224 can comprise functionality as more fully described herein, for example, as described above with regard to systems 100-200.

System 300 depicts an architecture wherein an operator has sunset their 3G radio access network (RAN), for example, to re-farm the 3G spectrum for LTE-advanced (LTE-A), 5G, and/or other next-generation network evolution, and sunset the 3G core networks. In this example scenario, a direct interface, for example, a diameter-based interface (e.g., SGd) is utilized for messaging services between the MME 102 and SMSC 208. In one aspect, the SMSC 208 can be utilized for direct communication with external IoT application providers 202. However, it is noted that the subject specification is not that limited. For example, the SMSC 208 can communicate with external IoT application providers 202 via the SCEF/MTC-IWF 220 or a messaging services gateway (not shown). Moreover, the SCEF/MTC-IWF 220 can communicate with the SMSC 208 via a T4 diameter interface and can communicate with the external IoT application providers 202 via a standardized and structured API call.

According to an embodiment, on determining that a message (e.g., a SMS message) is to be delivered to the LTE IoT UE 206, MME 102 can provide information associated with LTE IoT UE 206, such as, but not limited to, IoT device state (e.g., device is unreachable), mobility management context (e.g., category of the IoT device), an optimal wait period, an optimal retransmission time, and/or mapped device specific behaviors, to the SMSC 208. As an example, the optimal wait period and/or optimal retransmission time can be determined based on device category-based timers (e.g., PSM timer, eDRX timer, etc.), latency for communications between the MME 102 and the SMSC 208, traffic patterns for commercial devices (e.g., non-IoT devices) served by the MME 102, etc. In one aspect, the SMSC 208 can utilize the information to adjust its paging/retry mechanisms towards the MME 102 when there are pending messages to be delivered to the LTE IoT UE 206 (and/or group of LTE IoT UEs) from their IoT application providers 202.

Figure 4:
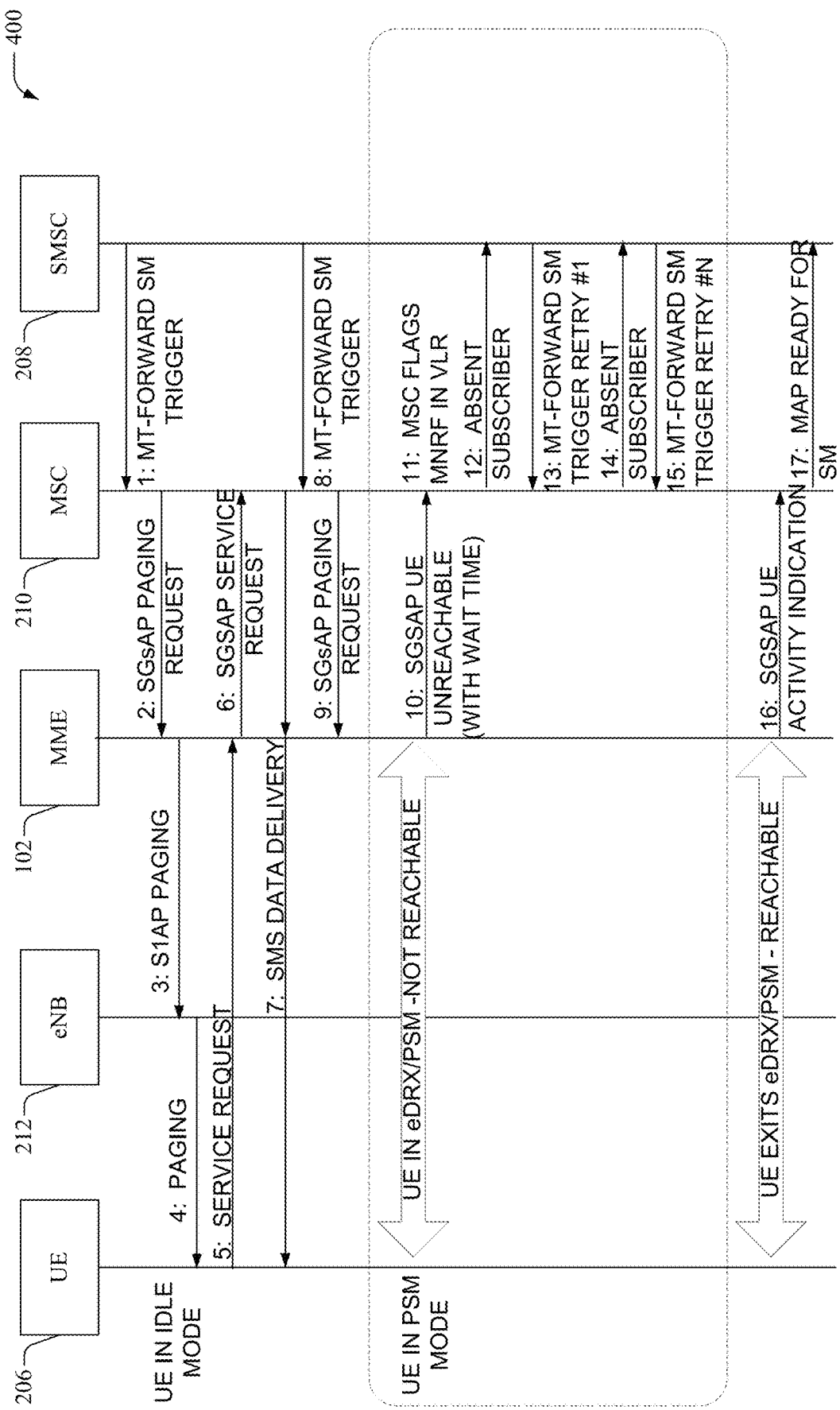
FIG. 4 illustrates an example call flow diagram for mobile terminated message delivery in a LTE/4G network.

Referring now to FIG. 4, there illustrated is an example call flow diagram 400 for mobile terminated message delivery in a LTE/4G network, according to an aspect of the subject disclosure. It is noted that the MME 102, UE 206, SMSC 208, MSC 210, and eNB 212 can comprise functionality as more fully described herein, for example, as described above with regard to systems 100-300. In one embodiment, the SMSC 208 can receive, from one or more IoT application providers, message(s) (e.g., a SMS message) directed to the UE 206 (or a group of UEs located in a defined area and/or belonging to a defined category). As an example, an appliance manufacturer can send a text message to update a configuration of a smart appliance. On receiving the message, the SMSC 208 can determine routing information (e.g., nodes serving the UE 206), for example, by querying a network subscriber database (e.g., HLR). On determining the routing information, at 1, the SMSC 208 can transmit a message request (e.g., MT-FORWARD SM TRIGGER) to the MSC 210 that serves UE 206. At 2, the MSC 210 can initiate a paging request (e.g., SGsAP paging request) to the MME 102. When the UE 206 is in idle mode, at 3, the MME 102 can an initiate a paging request (e.g., S1AP paging request) to the eNB 212, which in turn can transmit a paging request to the UE 206 (at 4). At 5, the UE 206 can transmit a service request to the MME 102, which can then forward the service request (e.g., SGsAP service request) to the MSC 210 (at 6). Further, at 7, SMS data can be delivered from the MSC 210 to the UE 206.

Acts 8-15 depict an example scenario for message delivery when the UE 206 is determined to be in a PSM (or eDRX and/or other unreachable mode). Similar to the above, when the SMSC 208 receives a message directed to the UE 206, at 8, the SMSC 208 can transmit a message request (e.g., MT-FORWARD SM TRIGGER) to the MSC 210 and at 9, the MSC 210 can initiate a paging request (e.g., SGsAP paging request) to the MME 102. The MME 102 can determine that the UE 206 is unreachable (e.g., in a PSM and/or eDRX mode) and determine a wait time based on various factors, such as, but not limited to, UE context data, mapping tables, policy data, commercial traffic data, latency data, network-defined timers, etc. At 10, the MME 102 can notify the MSC 210 that the UE 206 is unreachable and provide the MSC 210 with the wait time. At 11, the MSC 210 can flag the UE as unreachable in a visitor location register (VLR) (e.g., by setting the mobile not reachable flag (MNRF)). Further, at 12, the MSC 210 can forward the notification and the wait time to the SMSC 208 (e.g., via an ABSENT SUBSCRIBER message). The SMSC 208 can utilize the received information to adjust its message retry mechanisms. For example, the SMSC 208 can reduce the frequency of message retransmissions (or in some cases stop the message retransmissions) until the wait time has expired. Moreover, as shown at 13-15, the SMSC 208 can retransmit the message requests N times (wherein N is most any non-negative integer that has been selected based on the wait time) and the MSC 210 can provide the SMSC 208 with an absent subscriber message. In one aspect, when the UE 206 exits the unreachable mode (e.g., on expiration of a PSM or eDRX timer and/or if there is any impending UE originated data to be sent to the service provider via the network), the MME 102 can detect the change in the UE's mobility management state and can update its context database (e.g., UE context data 108). Once the database has been updated and the MME 102 has detected the UE activity, at 16, the MME 102 can transmit a UE activity indication to the MSC 210, which can then clear the MNRF flag for the UE 206 and can notify the SMSC 208 that the UE 206 is now available for message delivery (e.g., at 17, via MAP READY for SM message). Until such activity is detected by the MSC 210 via the MME 102 and by the SMSC 208 via MSC 210, the MSC 210 and/or the SMSC 208 can maintain their timers and device management state to prevent triggering any unwanted signaling in the network. On receiving the notification, the SMSC 208 can reinitiate the message request and facilitate delivery of the pending message to the UE 206. This deterministic model of message delivery by the network based on the device state change and/or reachability updates while the UE 206 enters and exits the PSM mode and/or eDRX mode significantly benefits the network to avoid unnecessary signaling and/or retransmissions at the node level and ensures robust network functionality. This in turn improves the overall IoT service behaviors across various industry verticals. The ability of mobility core network nodes to proactively exchange message transfers with the right set of attributes based on device categories, mobility management behaviors, timers for entry into and exit out of extended/deep sleep modes and utilization of such information by the peer nodes to facilitate device management helps in building a robust control plane message delivery framework that can be adopted for IoT devices.

Figure 5:
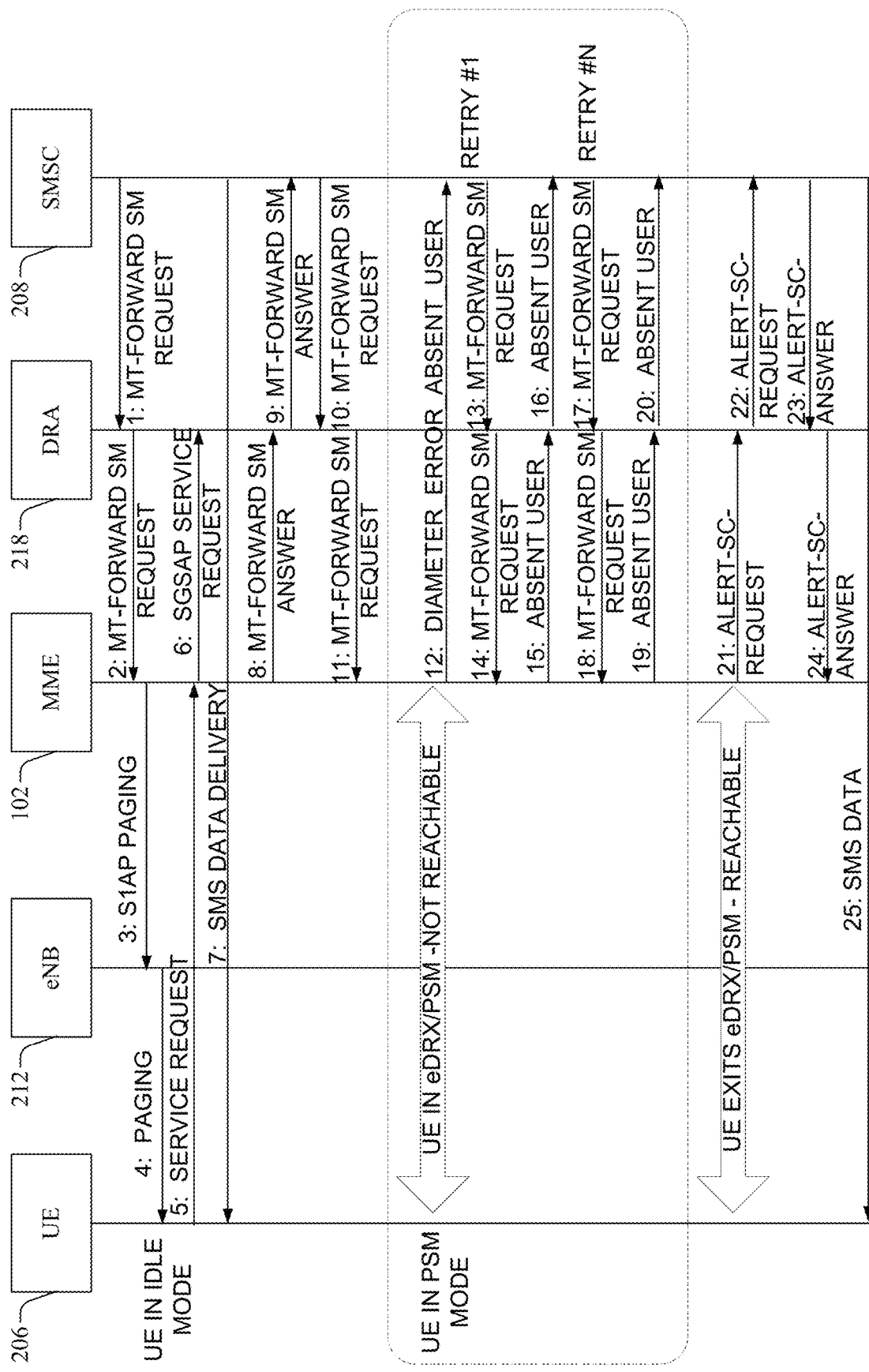
FIG. 5 illustrates an example call flow diagram for mobile terminated message delivery in an evolved LTE network.

FIG. 5 illustrates an example call flow diagram 500 for mobile terminated message delivery in an evolved LTE network, according to an aspect of the subject disclosure. It is noted that the MME 102, UE 206, SMSC 208, eNB 212, and DRA 218 can comprise functionality as more fully described herein, for example, as described above with regard to systems 100-300. In one embodiment, the SMSC 208 can receive, from one or more IoT application providers, message(s) (e.g., a SMS message) directed to the UE 206 (or a group of UEs located in a defined area and/or belonging to a defined category). As an example, a utility company can send a text message to update a configuration of smart meters in a given area. On receiving the message, the SMSC 208 can determine routing information (e.g., nodes serving the UE 206), for example, by querying a network subscriber database. On determining the routing information, at 1, the SMSC 208 can transmit a message request (e.g., MT-FORWARD SM REQUEST) to the DRA 218, which can forward the request to the MME 102 that serves UE 206 (at 2). When the UE 206 is in idle mode, at 3, the MME 102 an initiate a paging request (e.g., S1AP paging request) to the eNB 212, which in turn can transmit a paging request to the UE 206 (at 4). At 5, the UE 206 can transmit a service request to the MME 102, which can then forward the service request (e.g., SGsAP service request) to the DRA 218 (at 6). At 7, SMS data can be delivered from the SMSC 208 to the UE 206. On delivery of the SMS data, at 8, the MME 102 can provide a MT-FORWARD SM ANSWER to the DRA 218, which can forward the MT-FORWARD SM ANSWER to the SMSC 208 (at 9).

Acts 10-20 depict an example scenario for message delivery when the UE 206 is determined to be in a PSM (or eDRX and/or other unreachable mode). Similar to the above, when the SMSC 208 receives a message directed to the UE 206, at 10, the SMSC 208 can transmit a message request (e.g., MT-FORWARD SM REQUEST) to the DRA 218 and at 11, the DRA 218 can forward the request to the MME 102. The MME 102 can determine that the UE 206 is unreachable (e.g., in a PSM and/or eDRX mode) and determine a wait time based on various factors, such as, but not limited to, UE context data, mapping tables, policy data, commercial traffic data, latency data, network-defined timers, etc. It is noted that, in one example, a single MME (e.g., MME 102) can serve millions of IoT devices across multiple industry verticals, each having distinct sleep cycles. When delivering mobile terminated short messages via SGd interface to such mix of devices, the contextual information of the devices including their category, sleep interval timers, and/or the closed-loop transport latency with the serving SMSCs is extremely important. Any abnormal behaviors in the diameter traffic routing via the DRA agents and asymmetric latency paths could affect SGd application signaling procedures within the MME and could disrupt the network functionality causing ripple affects to other mission critical services.

At 12, the MME 102 can notify the SMSC 208 that the UE 206 is unreachable and provide the SMSC 208 with the wait time (e.g., via a DIAMETER ERROR ABSENT USER message). The SMSC 208 can utilize the received information to adjust its message retry mechanisms. For example, the SMSC 208 can reduce the frequency of message retransmissions (or in some cases stop the message retransmissions). Moreover, as shown at 13-20, the SMSC 208 can retransmit the message requests N times (wherein N is most any non-negative integer that has been selected based on the wait time) and the MME 102 can provide the SMSC 208 with an absent user message.

In one aspect, when the UE 206 exits the unreachable mode (e.g., PSM and/or eDRX mode), at 21, the MME 102 can transmit a request (e.g., ALERT-SC-REQUEST) to the DRA 218, which can forward the request to the SMSC 208. Moreover, the request notifies the SMSC 208 that the UE 206 is available for message delivery. On receiving the notification, the SMSC 208 can provide an answer to the request (e.g., ALERT-SC-ANSWER) that is routed to the MME 102 via the DRA 218 (at 23-24). Further, at 25, the SMSC 208 can deliver the SMS data to the UE 206.

Figure 6:
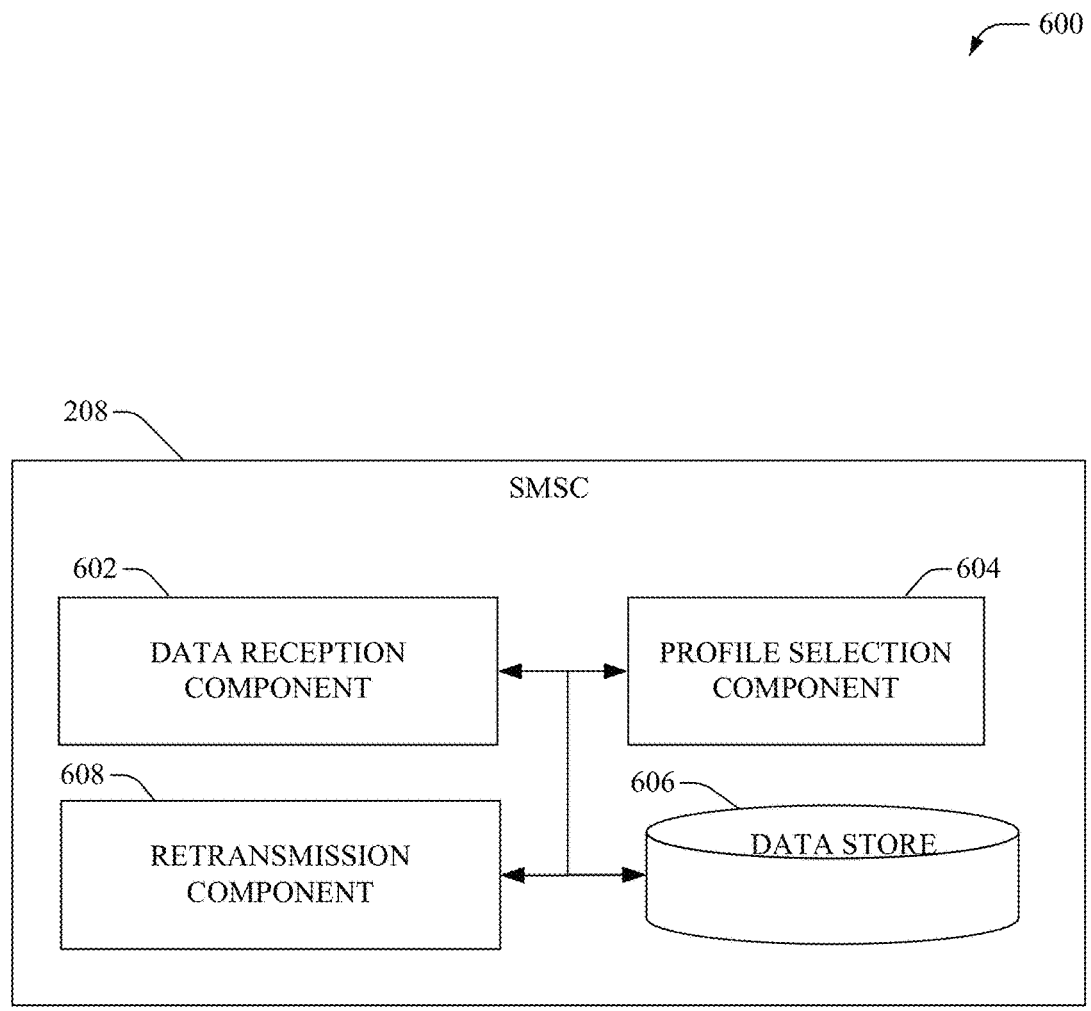
FIG. 6 illustrates an example system that facilitates adjusting message retry mechanisms, to one or more aspects of the disclosed specification.

FIG. 6 illustrates an example system 600 that facilitates adjusting message retry mechanisms, in accordance with the subject disclosure. It is noted that the SMSC 208 can comprise functionality as more fully described herein, for example, as described above with regard to systems 100-500. The SMSC 208 handles messaging operations, such as routing, forwarding and storing incoming messages directed to destination UEs. In one example, the SMSC 208 can handle (but is not limited to handling) messages of a defined length (e.g., up to 160 characters). Larger messages can automatically be split up into several parts.

In one aspect, the SMSC 208 can receive messages from one or more IoT application providers, a message (e.g., a SMS message) that is directed to one or more IoT devices (e.g., UE 206). On receiving the message, the SMSC 208 can determine routing information, for example, by querying a network subscriber database. Based on the routing information, the SMSC 208 can direct a request to a control plane entity (e.g., MME) serving the IoT device. In one example, if the IoT device is unreachable (e.g., in a PSM and/or eDRX mode), a data reception component can receive, from the control plane entity, status information (e.g., indicating that the IoT device is unreachable) and a wait time (e.g., determined based on various factors, such as, but not limited to, UE context data, mapping tables, policy data, commercial traffic data, latency data, UE delay tolerance, etc). A profile selection component 604 can utilize the received data to select a retry profile (e.g., stored in data store 606), for example, to modify a frequency of request retransmissions.

As an example, the data store 606 can store multiple profiles that define parameters for message retransmissions (e.g., a first profile can specify that the SMSC 208 is to attempt 6 retries and each retry be 1 minute apart; a second profile can specify that the SMSC 208 is to attempt 10 retries and each retry be 10 hrs apart; and so on). A retransmission component 608 can perform a retransmission of the request message in accordance with the selected profile.

Figure 7:
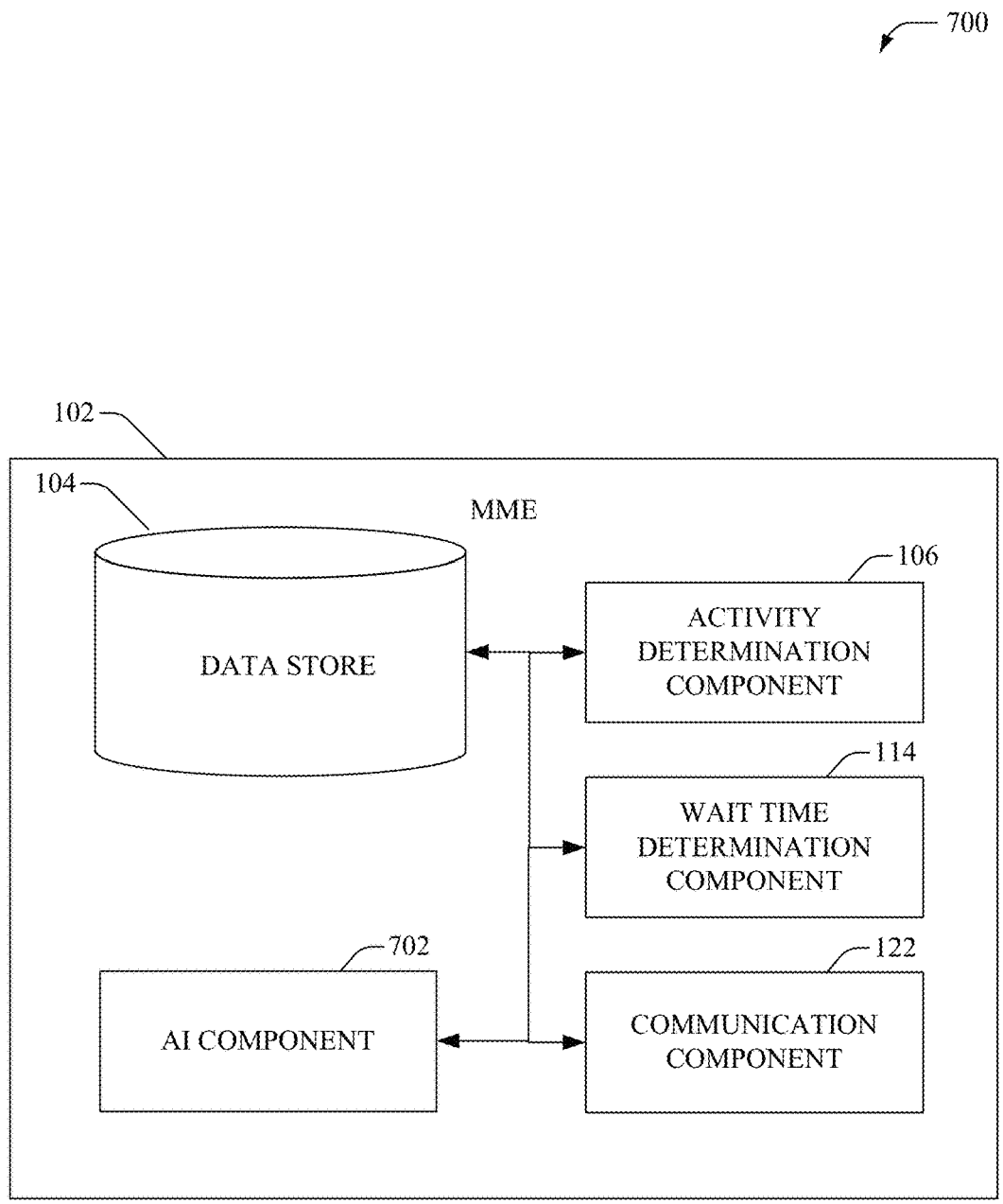
FIG. 7 illustrates an example system that facilitates automating one or more features in accordance with the subject embodiments.

Referring now to FIG. 7, there illustrated is an example system 700 that employs an artificial intelligence (AI) component (702) to facilitate automating one or more features in accordance with the subject embodiments. It can be noted that the MME 102, data store 104, activity determination component 106, wait time determination component 114, and communication component 122 can comprise functionality as more fully described herein, for example, as described above with regard to systems 100-600.

In an example embodiment, system 700 (e.g., in connection with automatically determining an optimal wait time) can employ various AI-based schemes (e.g., intelligent processing/analysis, machine learning, etc.) for carrying out various aspects thereof. For example, a process for determining timing data representing a time period during which message retransmission should be avoided or minimized can be facilitated via an automatic classifier system implemented by AI component 702. Moreover, the AI component 702 can exploit various artificial intelligence (AI) methods or machine learning methods. Artificial intelligence techniques can typically apply advanced mathematical analysis—e.g., decision trees, neural networks, regression analysis, principal component analysis (PCA) for feature and pattern extraction, cluster analysis, genetic algorithm, or reinforced learning—to a data set. In particular, AI component 702 can employ one of numerous methodologies for learning from data and then drawing inferences from the models so constructed. For example, hidden markov models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 702 can be used to automatically learn and perform a number of functions, comprising but not limited to determining according to a predetermined criteria, a wait time period during which message retransmissions are to be avoided or minimized. The criteria can comprise, but is not limited to, historical patterns and/or trends, network operator preferences and/or policies, application/service provider preferences, predicted traffic flows, event data, latency data, reliability/availability data, current time/date, and the like.

The next generation of devices and their smart connectivity as well as message delivery in the mobility infrastructure places significant demands on the networks to be intelligent, dynamic, flexible, proactive, and maintain closed-loop active communication. According to an embodiment, the network architecture disclosed herein provides several non-limiting advantages and features such as, but not limited to, (i) enhancing the mapping capabilities in the MME context database based on device dynamics and creation of unique mapping profiles for IoT class of devices; (ii) facilitating a proactive message exchange between core network functions (e.g., MME-MSC and MSC-SMSC, MME-SMSC) when IoT devices change their mobility management state, reachability, and/or enter into PSM/eDRX mode with extended timers; (iii) facilitating an efficient design and development of smart mobility software defined networking solutions with interworking functions that are aware of device identities, categories, application priorities, and/or behaviors over time; (iv) effectively managing the message delivery methods from external IoT providers to their targeted devices with measurable performance metrics; (v) providing an analytics driven solutions to track the overall mobility network behaviors and IoT service layer; and/or (vi) delivering a superior IoT service and/or application layer performance across the global IoT connectivity solutions; etc.

Figure 8:
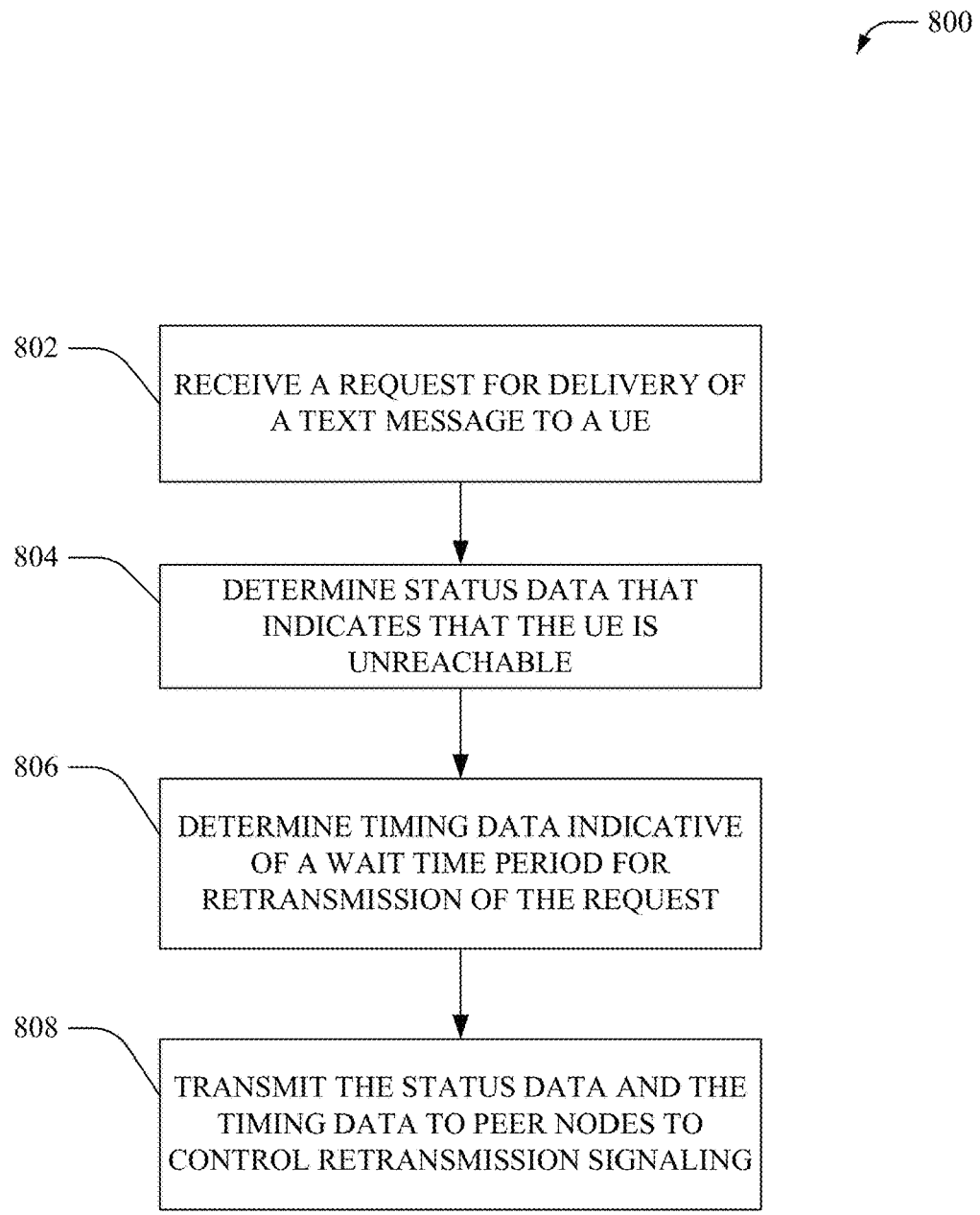
FIG. 8 illustrates an example method that optimizes retransmission signaling during mobile terminated message delivery.
Figure 9:
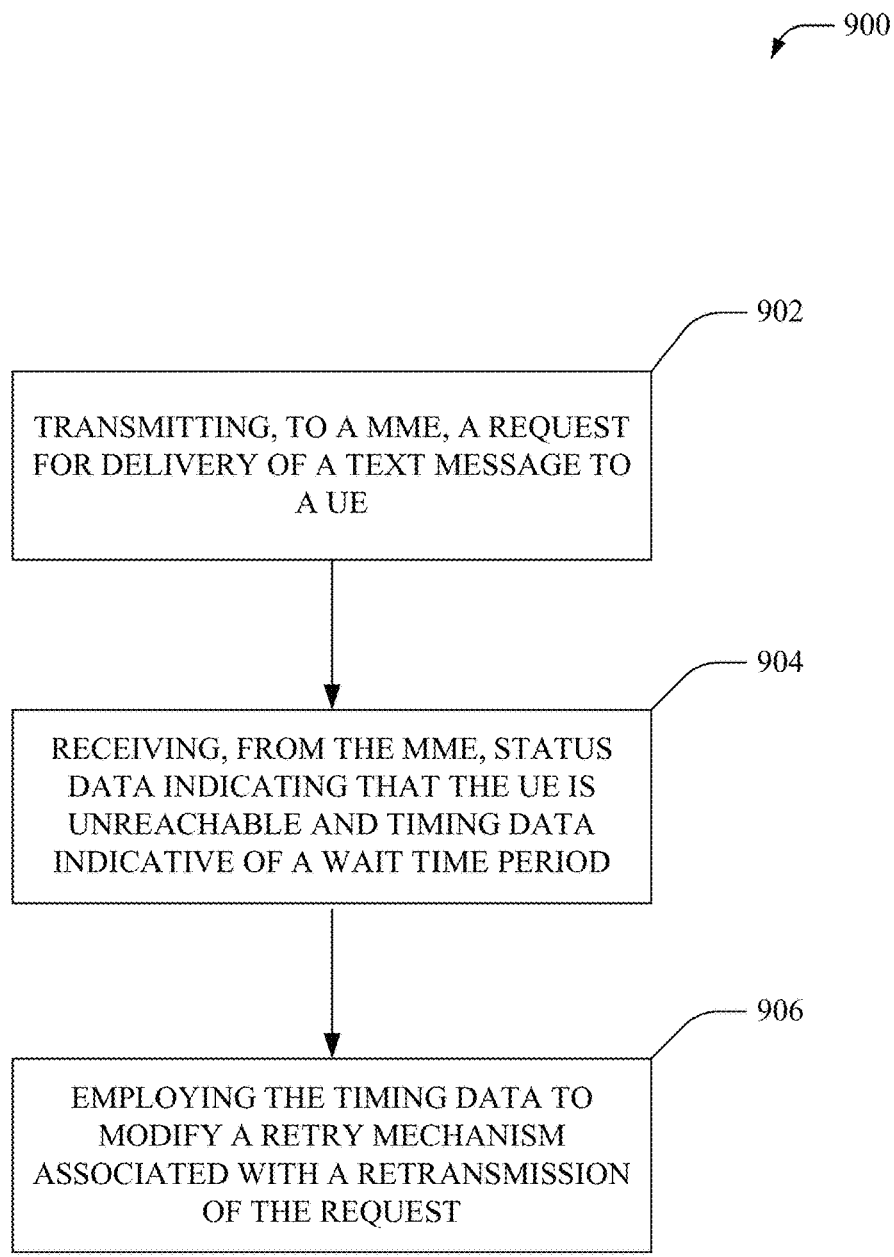
FIG. 9 illustrates an example method for controlling retransmission signaling during mobile terminated message delivery.

FIGS. 8-9 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 8 there illustrated is an example method 800 that optimizes retransmission signaling during mobile terminated message delivery, according to an aspect of the subject disclosure. In an aspect, method 800 can be implemented by one or more control plane devices (e.g., MME 102) of a communication network (e.g., cellular network). At 802, a request for delivery of a text message (e.g., SMS) to a UE (e.g., IoT device) can be received, for example, from an SMSC. For example, during mobile terminated SMS delivery from a service provider, the SMSC can provide a request to deliver the short message to the MME via a SGd interface. At 804, status data that indicates that the UE is unreachable can be determined (e.g., based on UE context data). For example, when IoT devices enter extended/deep sleep modes (e.g., PSM and/or eDRX mode) they are not be reachable by the control plane device.

At 806, timing data indicative of a wait time period for retransmission of the request can be determined. As an example, the timing data can be determined based on various factors, such as, but not limited to, UE context data, mapping tables, policy data, commercial traffic data, latency data, UE delay tolerance, sleep mode timer values, etc. At 808, the status data and the timing data can be transmitted to peer nodes (e.g., MSC and/or SMSC) to control signaling associated with a retransmission of the request. For example, the number of retransmission can be reduced (or retransmissions can be prohibited) during the wait time period.

FIG. 9 illustrates an example method 900 for controlling retransmission signaling during mobile terminated message delivery, according to an aspect of the subject disclosure. As an example, method 900 can be implemented by one or more network devices (e.g., SMSC 208) of a communication network (e.g., cellular network). At 902, a request for delivery of a text message to a UE (e.g., IoT device) can be transmitted to a MME. At 904, status data indicating that the UE is currently unreachable and timing data indicating a wait time period can be received from the MME. As an example, the status data and/or the timing data can be determined based on various factors, such as, but not limited to, UE context data, mapping tables, policy data, commercial traffic data, latency data, UE delay tolerance, sleep mode timer values, etc. At 906, the timing data can be utilized to modify a retry mechanism associated with a retransmission of the request. In one aspect, the timing data can be utilized to select a retry profile that defines a policy for retransmission of the request. As an example, the policy can specify reducing (or denying) the signaling transmitted during the wait time period.

Figure 10:
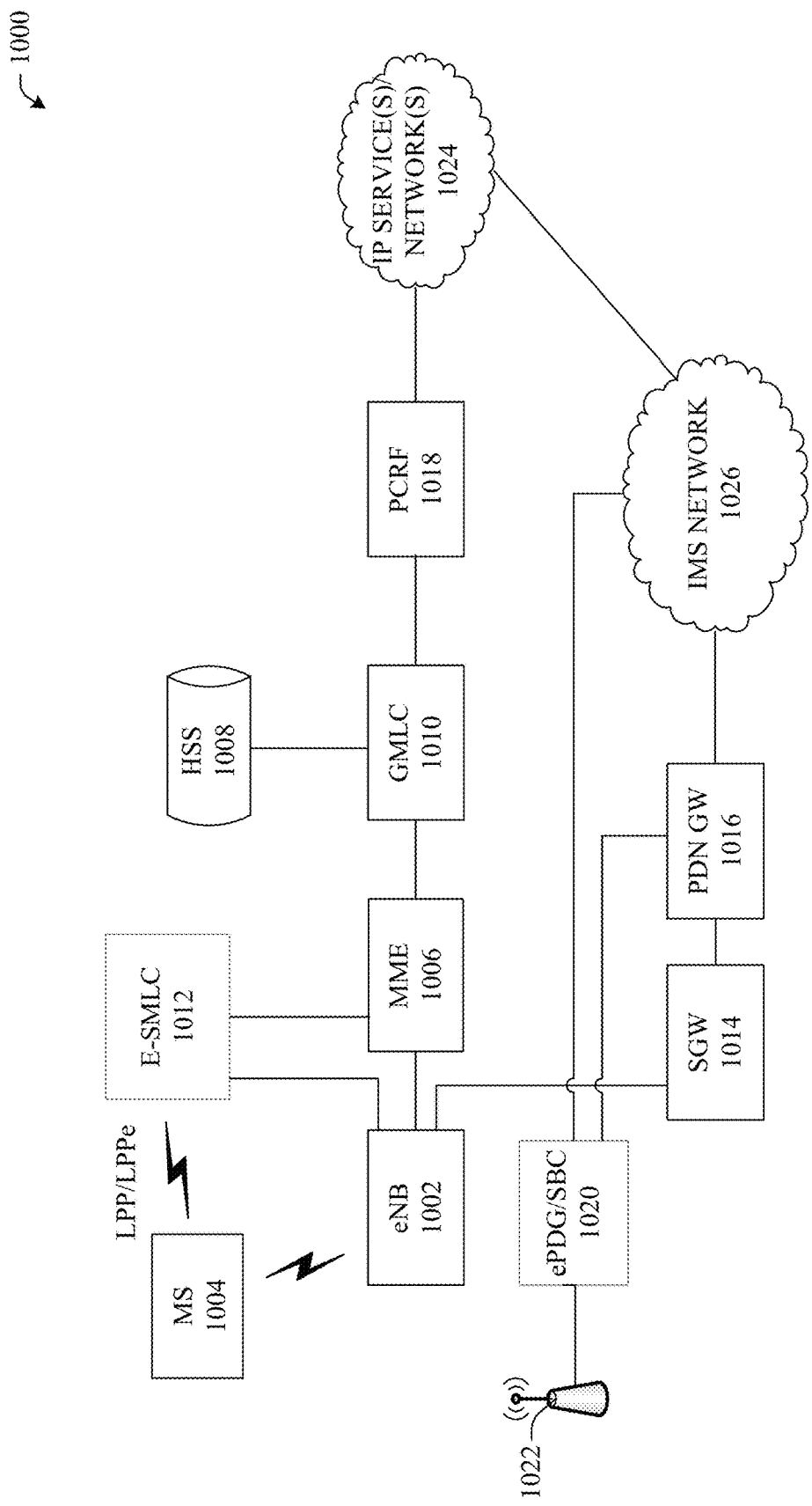
FIG. 10 illustrates a LTE network architecture that can employ the disclosed architecture.

FIG. 10 illustrates a high-level block diagram that depicts an example LTE network architecture 1000 that can employ the disclosed communication architecture. In one aspect, network architecture 1000 can comprise at least a portion of systems 100-700. The evolved RAN for LTE consists of an eNodeB (eNB) 1002 that can facilitate connection of MS 1004 to an evolved packet core (EPC) network. In one aspect, the MS 1004 is physical equipment or Mobile Equipment (ME), such as a mobile phone or a laptop computer that is used by mobile subscribers, with a Subscriber identity Module (SIM). The SIM comprises an International Mobile Subscriber Identity (IMSI) and/or MSISDN, which is a unique identifier of a subscriber. The MS 1004 comprises an embedded client that receives and processes messages received by the MS 1004. As an example, the embedded client can be implemented in JAVA. It is noted that the MS 1004 can be substantially similar to UE 206 and can comprise functionality as more fully described herein, for example, as described above with regard to UE 206.

The connection of the MS 1004 to the evolved packet core (EPC) network is subsequent to an authentication, for example, a SIM-based authentication between the MS 1004 and the evolved packet core (EPC) network. In one aspect, the MME 1006 provides authentication of the MS 1004 by interacting with the Home Subscriber Server (HSS) 1008 via a gateway mobile location centre (GMLC) 1010. The GMLC 1010 can request routing information from the HSS 1008. The HSS 1008 contains a subscriber profile and keeps track of which core network node is currently handling the subscriber. It also supports subscriber authentication and authorization functions (AAA). In networks with more than one HSS 1008, a subscriber location function provides information on the HSS 1008 that contains the profile of a given subscriber. In one aspect, this authentication can be utilized to secure population of the user/device profile data by a primary user. Further, the MME 1006 can be coupled to an enhanced serving mobile location center (E-SMLC) 1012 supports location services (LCS) and coordinates positioning of the MS 1004. The MS 1004 and the E-SMLC can communicate using an LTE positioning protocol (LPP) and/or LPP extensions (LPPe). It is noted that the MME 1006 can be substantially similar to MME 102 and can comprise functionality as more fully described herein, for example, as described above with regard to MME 102.

As an example, the eNB 1002 can host a PHYsical (PHY), medium access control (MAC), radio link control (RLC), and packet data control protocol (PDCP) layers that comprise the functionality of user-plane header-compression and encryption. In addition, the eNB 1002 can implement at least in part radio resource control (RRC) functionality (e.g., radio resource management, admission control, scheduling, cell information broadcast, etc.). The eNB 1002 can be coupled to a serving gateway (SGW) 1014 that facilitates routing of user data packets and serves as a local mobility anchor for data bearers when the MS 1004 moves between eNBs. The SGW 1014 can act as an anchor for mobility between LTE and other 3GPP technologies (e.g., GPRS, UMTS, etc.). When MS 1004 is in an idle state, the SGW 1014 terminates a downlink (DL) data path and triggers paging when DL data arrives for the MS 1004. Further, the SGW 1014 can perform various administrative functions in the visited network such as collecting information for charging and lawful interception. In one aspect, the SGW 1014 can be coupled to a packet data network gateway (PDN GW) 1016 that provides connectivity between the MS 1004 and external packet data networks such as IP service(s)/network (s) 1024 via the IP multimedia subsystem (IMS) network 1026. Moreover, the PDN GW 1016 is a point of exit and entry of traffic for the MS 1004. It is noted that the MS 1004 can have simultaneous connectivity with more than one PDN GW (not shown) for accessing multiple PDNs. It is noted that the eNB 1002 can be substantially similar to eNB 212 and can comprise functionality as more fully described herein, for example, as described above with regard to eNB 212.

The PDN GW 1016 performs IP address allocation for the MS 1004, as well as QoS enforcement and implements flow-based charging according to rules from a policy control and charging rules function (PCRF) 1018. The PCRF 1018 can facilitate policy control decision-making and control flow-based charging functionalities in a policy control enforcement function (PCEF), which resides in the PDN GW 1016. The PCRF 1018 can store data (e.g., QoS class identifier and/or bit rates) that facilitates QoS authorization of data flows within the PCEF. In one aspect, the PDN GW 1016 can facilitate filtering of downlink user IP packets into the different QoS-based bearers and perform policy enforcement, packet filtering for each user, charging support, lawful interception and packet screening. Further, the PDN GW 1016 acts as the anchor for mobility between 3GPP and non-3GPP technologies such as WiMAX and 3GPP2 (CDMA 1X and EvDO). An evolved packet data gateway (ePDG) 1020 is employed for communications between the EPC and untrusted non-3GPP networks that require secure access, such as a Wi-Fi, LTE metro, and femtocell access networks, for example served by access point 1022. Although a LTE network architecture 1000 is described and illustrated herein, it is noted that most any communication network architecture can be utilized to implement the disclosed embodiments.

Figure 11:
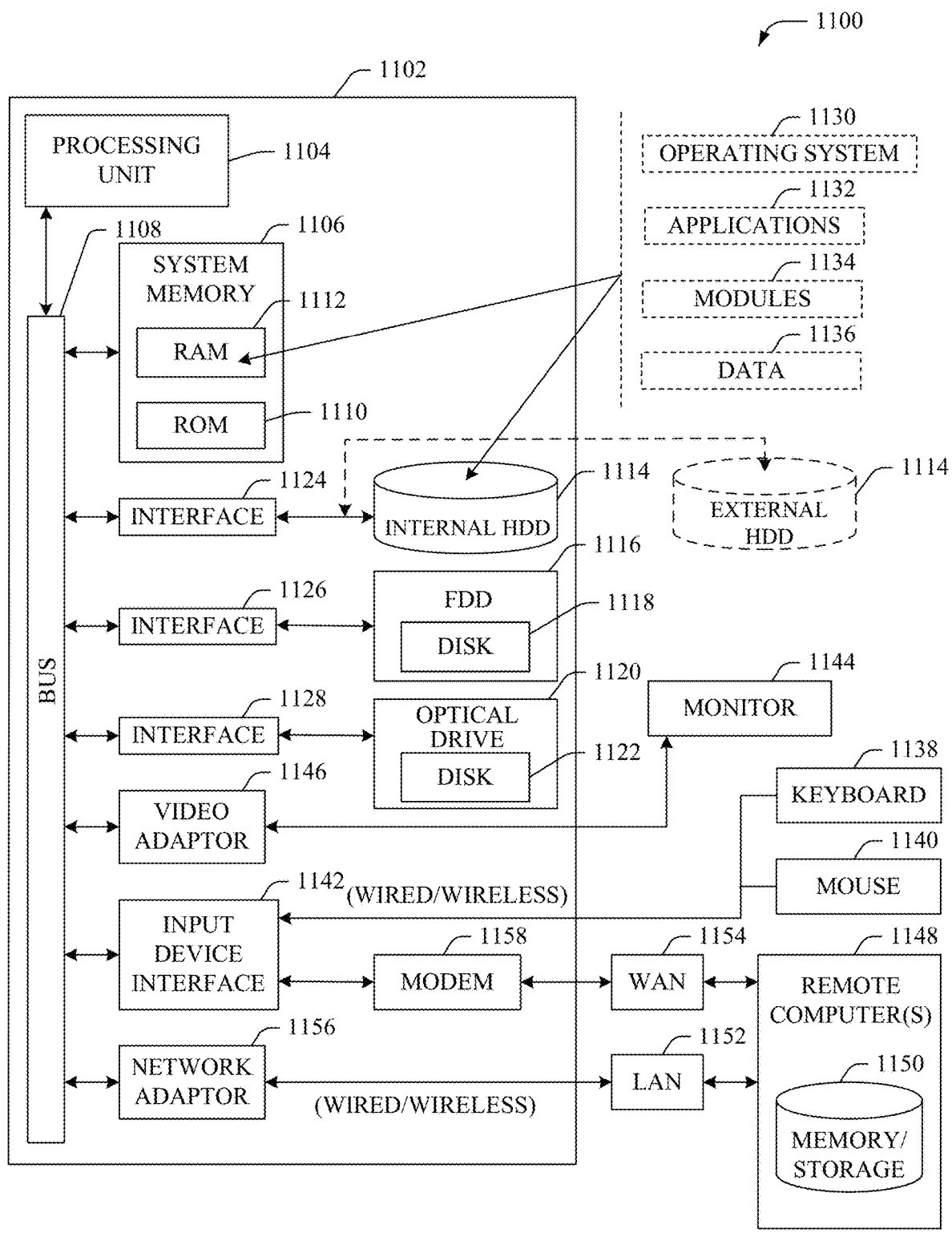
FIG. 11 illustrates a block diagram of a computer operable to execute the disclosed communication architecture.

Referring now to FIG. 11, there is illustrated a block diagram of a computer 1102 operable to execute the disclosed communication architecture. In order to provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 11, the example environment 1100 for implementing various aspects of the specification comprises a computer 1102, the computer 1102 comprising a processing unit 1104, a system memory 1106 and a system bus 1108. As an example, the component(s), application(s) server(s), equipment, system(s), interface(s), gateway(s), controller(s), node(s), engine(s), entity(ies), function(s) and/or device(s) (e.g., MME 102, data store 104, activity determination component 106, wait time determination component 114, communication component 122, IoT application provider 202, UE 206, SMSC 208, MSC 210, eNB 212, HeNB 213, small cells 216, DRA 218, SCEF/MTC-IWF 220, data reception component 602, profile selection component 604, data store 606, retransmission component 608, AI component 702, ENB 1002, MS 1004, MME 1006, HSS 1008, GMLC 101, E-SMLC 1012, SGW 1014, PDN GW 1016, PCRF 1018, IP service/networks 1024, IMS network 1026, etc.) disclosed herein with respect to systems 100-700 and 1000 can each comprise at least a portion of the computer 1102. The system bus 1108 couples system components comprising, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of universal serial bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. It is noted that the specification can be implemented with various commercially available operating systems or combinations of operating systems.

A user can enter commands and information into the computer 1102 through one or more wired/wireless input devices, e.g., a keyboard 1138 and/or a pointing device, such as a mouse 1140 or a touchscreen or touchpad (not illustrated). These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc. A monitor 1144 or other type of display device is also connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also comprise a wireless access point disposed thereon for communicating with the wireless adapter 1156.

When used in a WAN networking environment, the computer 1102 can comprise a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be noted that the network connections shown are example and other means of establishing a communications link between the computers can be used.

The computer 1102 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
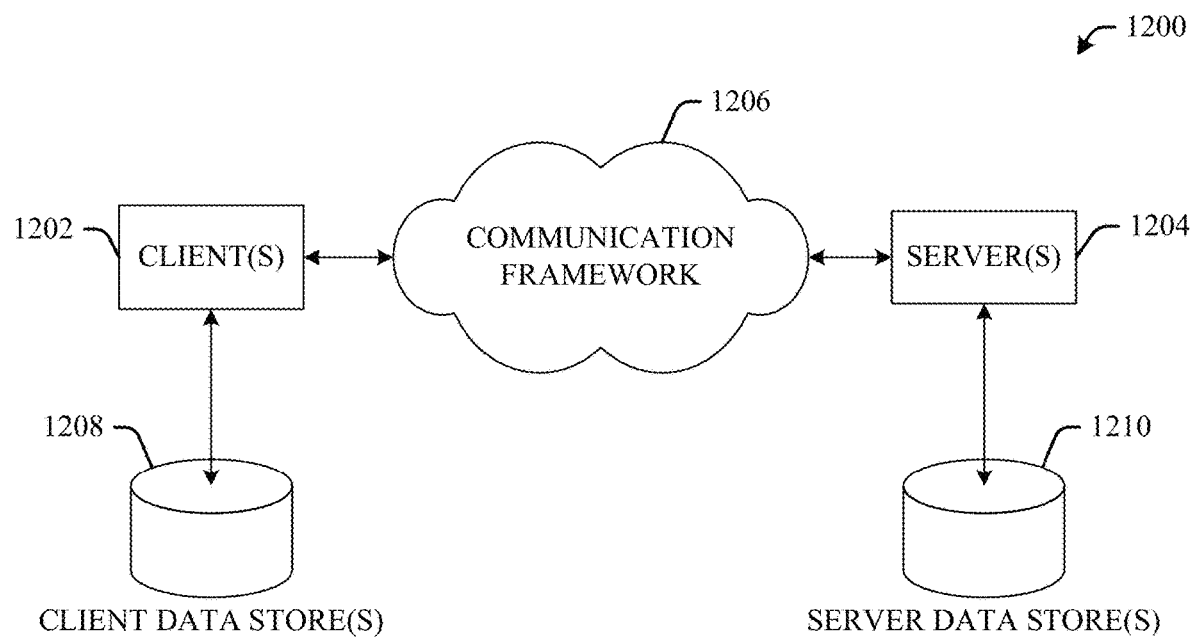
FIG. 12 illustrates a schematic block diagram of a computing environment in accordance with the subject specification.

Referring now to FIG. 12, there is illustrated a schematic block diagram of a computing environment 1200 in accordance with the subject specification. The system 1200 comprises one or more client(s) 1202. The client(s) 1202 can be hardware and/or software (e.g., threads, processes, computing devices).

The system 1200 also comprises one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet may comprise a cookie and/or associated contextual information, for example. The system 1200 comprises a communication framework 1206 (e.g., a global communication network such as the Internet, cellular network, etc.) that can be employed to facilitate communications between the client(s) 1202 and the server(s) 1204.

Communications can be facilitated via a wired (comprising optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
  verifying that an Internet of things device, which is an Internet of things type of device and is served by a control plane device via a network, has been granted authorization to enter a low power mode during which the Internet of things device is not reachable by the control plane device;
  in response to the verifying and receiving request data indicative of a request to transmit a message from a messaging server of the network to the Internet of things device, determining timing data comprising a retransmission time for a retransmission of the request data based on traffic data representing traffic associated with a user equipment served by the control plane device, wherein the user equipment is not of the Internet of things type of device, and wherein determining the timing data comprises:
    predicting, based on historical traffic data of the traffic data, respective predicted traffic for future time periods associated with the user equipment, and
    selecting the retransmission time to correspond to a future time period of the future time periods having a predicted traffic below a defined threshold; and
  directing the timing data to the messaging server.

2. The system of claim 1, wherein the timing data initiates the messaging server to modify a message retransmission policy associated with the retransmission of the request data.

3. The system of claim 1, wherein the timing data initiates the messaging server to reduce a frequency of signaling retransmissions of the request data from the messaging server during a wait period.

4. The system of claim 1, wherein the message is a short message service message and the messaging server is a short message service center device.

5. The system of claim 1, wherein the timing data is further determined based on a service requirement of the Internet of things device.

6. The system of claim 1, wherein the timing data is further determined based on latency data indicative of latency for communications between the control plane device and the messaging server.

7. The system of claim 1, wherein the timing data is further determined based on delay tolerance data indicative of a delay tolerance of the Internet of things device.

8. The system of claim 1, wherein the timing data is further determined based on a value of a network-defined timer associated with the low power mode.

9. The system of claim 1, wherein the Internet of things device is registered with a network device of the network during the low power mode.

10. The system of claim 1, wherein the message comprises an alphanumeric message.

11. A method, comprising:
determining, by a system comprising a processor, that an Internet of things device, served by a control plane device via a network, has entered a low power mode during which the Internet of things device is not reachable by the control plane device;
in response to the determining and further in response to receiving request data indicative of a request to transmit a message from a messaging server to the Internet of things device:
  determining, by the system, timing data comprising a retransmission time for a retransmission of the request data based on traffic data representing traffic associated with a non-Internet of things device served by the control plane device, wherein determining the timing data comprises:
    predicting, based on historical traffic data of the traffic data, respective predicted traffic for future time periods associated with user equipment, and
    selecting the retransmission time to correspond to a future time period of the future time periods having a predicted traffic below a defined threshold; and
directing, by the system, the timing data to the messaging server.

12. The method of claim 11, wherein the directing comprises directing the timing data to facilitate selection of a retry profile that defines parameters for the retransmission of the request data.

13. The method of claim 11, wherein determining the timing data comprises determining the timing data further based on a service requirement of the Internet of things device.

14. The method of claim 11, wherein determining the timing data comprises determining the timing data further based on latency data indicative of latency for communications between the control plane device and the messaging server.

15. The method of claim 11, wherein determining the timing data comprises determining the timing data further based on delay tolerance data indicative of a delay tolerance of the Internet of things device.

16. The method of claim 11, further comprising:
in response to determining that the Internet of things device has exited the low power mode, directing, by the system, notification data to the messaging server that facilitates delivery of the message from the messaging server to the Internet of things device.

17. A non-transitory machine-readable medium, comprising executable instructions that, when executed by a processor of a control plane device, facilitate performance of operations, comprising:

receiving request data indicative of a request to transmit a message from a messaging server to an Internet of things device, served by the control plane device of a network;

in response to the receiving, determining that the Internet of things device is operating in a low power mode during which the Internet of things device is not reachable via the control plane device; and in response to the determining:

determining timing data comprising a retransmission time for a retransmission of the request data based on traffic data a non-Internet of things device served by the control plane device, wherein the determining the timing data comprises:

predicting, based on historical traffic data of the traffic data, respective predicted traffic for future time periods associated with user equipment, and selecting the retransmission time to correspond to a future time period of the future time periods having a predicted traffic below a defined threshold, and directing, to the messaging server, the timing data.

18. The non-transitory machine-readable medium of claim 17, wherein the message comprises a binary encrypted message.

19. The non-transitory machine-readable medium of claim 17, wherein the message utilizes a unicode transmission format that employs eight-bit code units.

20. The non-transitory machine-readable medium of claim 17, wherein the timing data initiates the messaging server to reduce signaling associated with the retransmission during a wait period.

* * * * *